(12) United States Patent
Park et al.

(10) Patent No.: US 12,223,220 B2
(45) Date of Patent: Feb. 11, 2025

(54) DISPLAY MODULE, AND METHOD FOR TRANSMITTING CONTROL SIGNAL FOR DISPLAY MODULE

(71) Applicant: SAMSUNG ELECTRONICS CO., LTD., Suwon-si (KR)

(72) Inventors: Junhyeong Park, Suwon-si (KR); Seogyong Jeong, Suwon-si (KR); Youngho Ryu, Suwon-si (KR); Jinbong Lee, Suwon-si (KR); Byeongguk Choi, Suwon-si (KR); Jungkyu Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/341,304

(22) Filed: Jun. 26, 2023

(65) Prior Publication Data

US 2023/0333799 A1 Oct. 19, 2023

Related U.S. Application Data

(63) Continuation of application No. PCT/KR2022/001315, filed on Jan. 25, 2022.

(30) Foreign Application Priority Data

Jan. 29, 2021 (KR) .................. 10-2021-0013054

(51) Int. Cl.
*G06F 1/16* (2006.01)
*G06F 3/14* (2006.01)

(52) U.S. Cl.
CPC ................. *G06F 3/1446* (2013.01)

(58) Field of Classification Search
None
See application file for complete search history.

(56) References Cited

U.S. PATENT DOCUMENTS

| 6,252,564 B1 | 6/2001 | Albert et al. |
| 2002/0075204 A1 | 6/2002 | Nakano et al. |

(Continued)

FOREIGN PATENT DOCUMENTS

| CN | 110310600 A | 10/2019 |
| EP | 4 107 841 | 12/2022 |

(Continued)

OTHER PUBLICATIONS

International Search Report for PCT/KR2022/001315 mailed May 6, 2022, 4 pages.

(Continued)

*Primary Examiner* — Carl Adams
(74) *Attorney, Agent, or Firm* — Nixon & Vanderhye P.C.

(57) ABSTRACT

A display module may comprise: at least one first antenna configured to receive an image signal corresponding to the display module, from among a plurality of display modules configured to display an entire image, which displays at least a part of the entire image, a second antenna configured to receive a trigger signal corresponding to the image signal, a signal generation circuit configured to generate a plurality of control signals for controlling the image signal from the trigger signal received through the second antenna, and a display panel configured to display the image signal received from the first antenna on the basis of the plurality of generated control signals.

20 Claims, 19 Drawing Sheets

(56) References Cited

U.S. PATENT DOCUMENTS

| | | | |
|---|---|---|---|
| 2006/0209745 A1 | 9/2006 | Macmullan et al. | |
| 2007/0201595 A1 | 8/2007 | Stimple et al. | |
| 2013/0262909 A1 | 10/2013 | Yang et al. | |
| 2016/0078833 A1 | 3/2016 | Kim et al. | |
| 2020/0327851 A1 | 10/2020 | Seo et al. | |
| 2021/0049967 A1 | 2/2021 | Zhang et al. | |
| 2021/0365082 A1* | 11/2021 | Jeong | G06F 3/1446 |

FOREIGN PATENT DOCUMENTS

| | | |
|---|---|---|
| JP | 2017062429 A | 3/2017 |
| KR | 950019824 A | 7/1995 |
| KR | 100804587 B1 | 2/2008 |
| KR | 20080013044 A | 2/2008 |
| KR | 20140139552 A | 12/2014 |
| KR | 20180032738 A | 4/2018 |
| KR | 102121272 B1 | 6/2020 |
| KR | 20200121097 A | 10/2020 |
| WO | WO 2021/235694 A1 | 11/2021 |

OTHER PUBLICATIONS

Written Opinion of the ISA for PCT/KR2022/001315 mailed May 6, 2022, 3 pages.
Extended European Search Report dated Apr. 26, 2024 for EP Application No. 22746204.1.
Korean Office Action dated Sep. 3, 2024 for KR Application No. 10-2021-0013054.
European Office Action dated Dec. 4, 2024 for EP Application No. 2276204.1.

\* cited by examiner

DISPLAY MODULE, AND METHOD FOR TRANSMITTING CONTROL SIGNAL FOR DISPLAY MODULE

CROSS-REFERENCE TO RELATED APPLICATIONS

This application is a continuation of International Application No. PCT/KR2022/001315 designating the United States, filed on Jan. 25, 2022, in the Korean Intellectual Property Receiving Office and claiming priority to Korean Patent Application No. 10-2021-0013054, filed on Jan. 29, 2021, in the Korean Intellectual Property Office, the disclosures of which are incorporated by reference herein in their entireties.

BACKGROUND

Field

The disclosure relates to a display module and a method of transmitting a control signal for controlling the display module.

Description of Related Art

Along with the development of semiconductor technology, various types of display devices are being developed. For example, a display screen may be configured with light emitting diode (LED) or liquid crystal display (LCD) elements or similar elements in various types of display devices. The technology development has led to an increase in the size of a display and release of products with better image quality and higher resolution.

As a type of display, micro LED (μLED) display is a rapidly growing display field, and a plurality of display panels may be connected in various manners to form one large display (e.g., a modular display).

A display (e.g., a micro LED display) may be driven by active matrix display data. In an active matrix display, for example, two types of data (e.g., digital data (e.g., image data) and control data) may be synchronized to drive a μLED display, thereby controlling light emission of a light emitting element (e.g., a light emitting diode (LED)) corresponding to each pixel. The digital data and the control data may be output from a data processing device (or a data processing circuit) (e.g., a timing controller (T-CON)) and transmitted to each display module (e.g., each display module of a modular display).

According to an embodiment, the μLED display may be in the form of a multi-structure assembly, and require multiple wired cables, when using wired cables and multiple connectors to transmit digital data and control data. When digital data and control data are transmitted wiredly between a T-CON and each display module as such, the display may have a complex internal configuration and an increased thickness.

According to an embodiment, when data is wirelessly transmitted between the T-CON and each display module, data may be synchronized for normal image display. In order to transmit a plurality of control data through one radio channel, a process of serializing the plurality of control data is required, and each display module receiving the transmitted control data needs additional deserializing and delay compensation processes for the received control data. Therefore, the display may be complicated in its internal configuration, and have an increased size.

SUMMARY

Embodiments of the disclosure may provide a display module and a method of transmitting a control signal for the display module, in which a timing controller wirelessly transmits a trigger signal synchronized with digital data (e.g., image data), and each display module generates a plurality of control data based on the trigger signal, thereby reducing components for data synchronization.

Embodiments of the disclosure may provide a display module and a method of transmitting a control signal for the display module, in which a trigger signal is generated based on a digital signal transmitted from a timing controller, and a plurality of control data are generated based on the trigger signal, thereby reducing components for data synchronization.

According to an example embodiment, a display module may include: at least one first antenna configured to receive an image signal corresponding to a display module configured to display at least part of an entire image among a plurality of display modules configured to display the entire image, a second antenna configured to receive a trigger signal corresponding to the image signal, a signal generation circuit configured to generate a plurality of control signals to control the image signal from the trigger signal received through the second antenna, and a display panel configured to display the image signal received from the at least one first antenna based on the generated plurality of control signals.

According to an example embodiment, a method of controlling a display module may include: receiving an image signal corresponding to a display module configured to display at least part of an entire image among a plurality of display modules configured to display the entire image through at least one first antenna, receiving a trigger signal corresponding to the image signal through a second antenna, generating a plurality of control signals to control the image signal from the trigger signal received through the second antenna, and displaying the image signal received from the at least one first antenna based on the generated plurality of control signals.

According to an example embodiment, a display module may include: at least one antenna configured to receive an image signal corresponding to a display module configured to display at least part of an entire image among a plurality of display modules configured to display the entire image, a first signal generation circuit configured to generate a trigger signal corresponding to the image signal by parsing the received image signal, a second signal generation circuit configured to generate a plurality of control signals to control the image signal from the trigger signal generated through the first signal generation circuit, and a display panel configured to display the image signal received from the antenna based on the generated plurality of control signals.

According to an example embodiment, a method of controlling a display module may include: receiving an image signal corresponding to a display module configured to display at least part of an entire image among a plurality of display modules configured to display the entire image through at least one antenna, generating a trigger signal corresponding to the image signal by parsing the received image signal, generating a plurality of control signals to control the image signal from the trigger signal generated through the first signal generation circuit, and displaying the image signal received from the at least one antenna based on the generated plurality of control signals.

In an electronic device including a modular display and a method of transmitting a control signal for the modular display According to an embodiment, when a timing controller wirelessly transmits digital data to each modular display, it may transmit a trigger signal synchronized with the digital data instead of a plurality of control data. Therefore, components for data synchronization may be reduced.

In an electronic device including a modular display and a method of transmitting a control signal for the modular display According to an embodiment, when a timing controller wirelessly transmits digital data to each modular display, a receiving side may generate trigger data from the digital data transmitted from the timing controller and generate a plurality of control data based on the generated trigger data. Therefore, components for data synchronization may be reduced.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
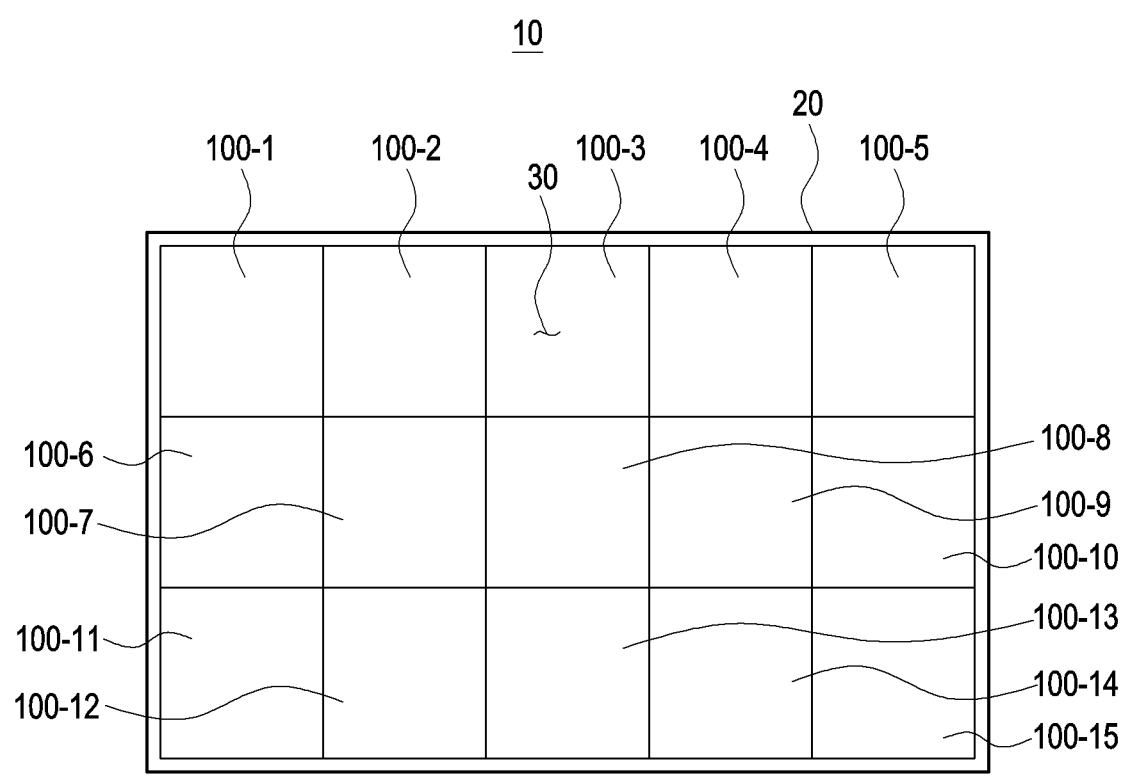
FIG. 1 is a diagram illustrating an electronic device including a modular display according to an embodiment.

Example embodiments of the disclosure will be described below in greater detail with reference to the attached drawings. It is to be noted that the same reference numerals are assigned to the same components as much as possible in the drawings. A detailed description of a known function and configuration may be avoided in the following description and the attached drawings where such descriptions may obscure the disclosure with unnecessary detail.

FIG. 1 is a diagram illustrating an electronic device 10 according to an embodiment. Referring to FIG. 1, the electronic device 10 (e.g., a display device) according to an embodiment of the disclosure may be a multi-display device (or a modular display) that implements a screen by connecting a plurality of display panels. The multi-display device may be a device in which a relatively large-sized screen (e.g., a large screen) is implemented by connecting several display panels. According to an embodiment, the multi-display device may configure a large screen by connecting a plurality of flat display panels such as liquid crystal display (LCD), field emission display (FED), plasma display panel (PDP), or organic light-emitting diode (OLED) panels. For example, the multi-display device may correspond to a large TV for exhibition in which a large screen is made by connecting several cathode ray tubes. Besides, a small portable device such as a mobile phone, a smartphone, or a personal digital assistant (PDA) as well as a household TV may correspond to the multi-display device by connecting a plurality of panels. An electronic device according to an embodiment of the disclosure may be any of various electronic devices including, for example, and without limitation, an electronic book, an electronic picture frame, an electronic blackboard, an electronic table, a large format display (LFD), a tablet, a desktop computer, a laptop computer, a kiosk, or the like, in addition to the afore-mentioned TV, mobile phone, smartphone, and PDA.

The electronic device 10 may simultaneously display one or more contents on an entire screen. The electronic device 10 according to an embodiment may support a multi-view (or multi-vision) mode as well as a normal mode. One content may be displayed in the normal mode, whereas a plurality of different contents may be displayed in the multi-view mode.

As illustrated in FIG. 1, the electronic device 10 according to an embodiment of the disclosure may be implemented in a form with a plurality of "display" panels 100-1, 100-2, 100-3, 100-4, . . . , 100-15 physically connected to each other. The plurality of display panels 100-1, 100-2, 100-3, 100-4, . . . , 100-15 may be arranged and connected to form one large screen, each being a unit display module which individually or selectively operates. Each of the plurality of "display" panels 100-1, 100-2, 100-3, 100-4, . . . , 100-15 may include a plurality of pixels. Each of the plurality of pixels included in each of the display panels 100-1, 100-2, 100-3, 100-4, . . . , 100-15 may be implemented as, but not limited to, a micro LED (μLED) pixel. For example, the display panel may also be implemented as an LCD, OLED, active-matrix OLED (AMOLED), PDP, quantum dot (QD) display, or the like. However, for convenience of description, the following description will be given on the assumption that each of the plural of display panels 100-1, 100-2, 100-3, 100-4, . . . , 100-15 is implemented as a μLED panel.

According to the embodiment illustrated in FIG. 1, the number of the plurality of display panels 100-1, 100-2, 100-3, 100-4, . . . , 100-15, or reference numerals assigned to the plurality of display panels 100-1, 100-2, 100-3, 100-4, . . . , 100-15 are merely an example, which do not limit the scope of various embodiments of the disclosure. Unlike FIG. 1, more or fewer than the plurality of display panels 100-1, 100-2, 100-3, 100-4, . . . , 100-15 may be included in the electronic device 10. According to an embodiment, while not shown in the drawings, a plurality of display panels in a 1×4 or N×M arrangement may form one display panel set. Various other embodiments are applicable.

The electronic device 10 may include a housing 20 providing a space in which the plurality of display panels 100-1, 100-2, 100-3, 100-4, . . . , 100-15 may be disposed, and a cover glass 30 for protecting the plurality of display panels. According to an embodiment, the housing may surround at least part of the periphery of the plurality of display panels 100-1, 100-2, 100-3, 100-4, . . . , 100-15, and accommodate a support member, a power/data transmission circuit board, and various electronic components in its internal space. The cover glass may be disposed on a front surface of the electronic device 10 to protect electronic components inside the electronic device 10 from external physical, chemical, or electrical impact.

Figure 2:
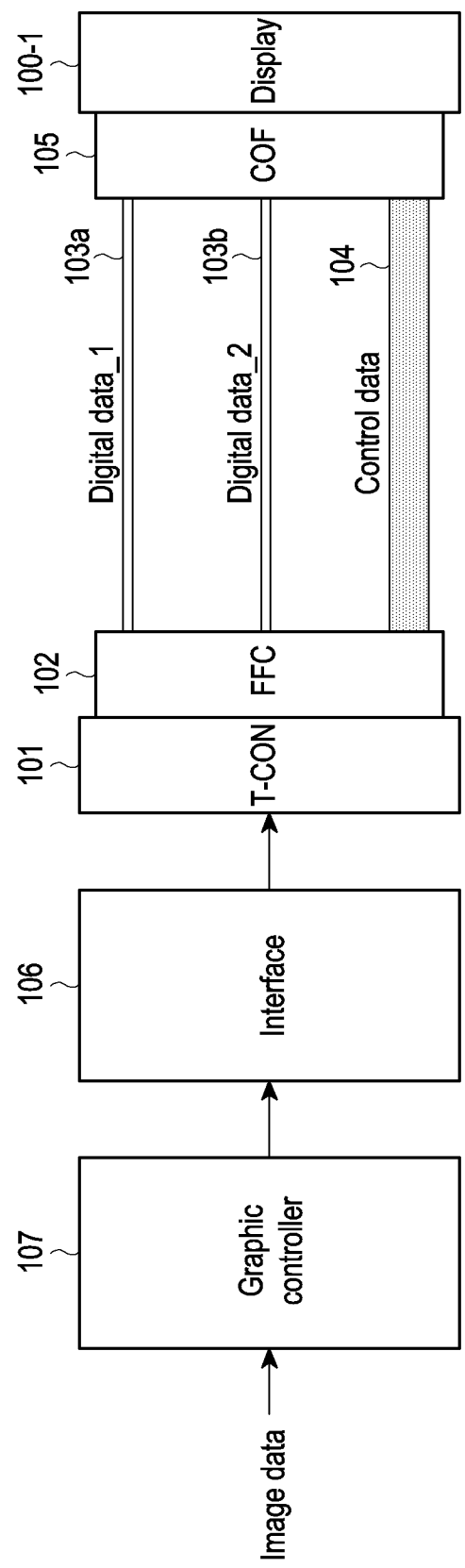
FIG. 2 is a block diagram illustrating an example configuration of an electronic device according to an embodiment.

FIG. 2 is a block diagram illustrating an example configuration of an electronic device according to an embodiment. Referring to FIG. 2, the electronic device 10 may include a graphic controller (e.g., including control circuitry) 107 (e.g., an analog to digital board (A/D board)), an interface (e.g., including interface circuitry) 106, a timing controller (T-CON) (e.g., including processing circuitry) 101, a flexible flat cable (FFE) 102, a chip on film (COF) 105, and a plurality of display panels 100-1, 100-2, . . . , 100-N. While only one display panel 100-1 (or display) is described for convenience of description in the following description, the same may be applied to the other display panels. The COF 105 and the one display panel 100-1 may be configured as one display module.

The graphic controller 107 of the electronic device 10 may include various circuitry and receive image data (e.g., an analog image signal or a digital image signal) through an image port. The graphic controller 107 may convert the input image data into data transmittable through the interface 106 by analog/digital conversion or image scaling. The data converted by the graphic controller 107 may be input to the T-CON 101 through the interface 106. For example, the data input from the interface 106 to the T-CON 101 may include, but not limited to, the image data (e.g., R, G, B) and a control signal.

The T-CON 101 may include various processing circuitry and at least one semiconductor for display, which controls the amount of data transmitted to each display panel 100 (e.g., a display driver IC (DDI) of the display panel 100) and improves image quality. For example, the T-CON 101 may receive image data from the outside (e.g., a tuner or the graphic controller 107), generate digital data 103 (including 103a, 103b) and control data 104, and transmit the data to the COF 105 through the FFC 102.

Figure 3A:
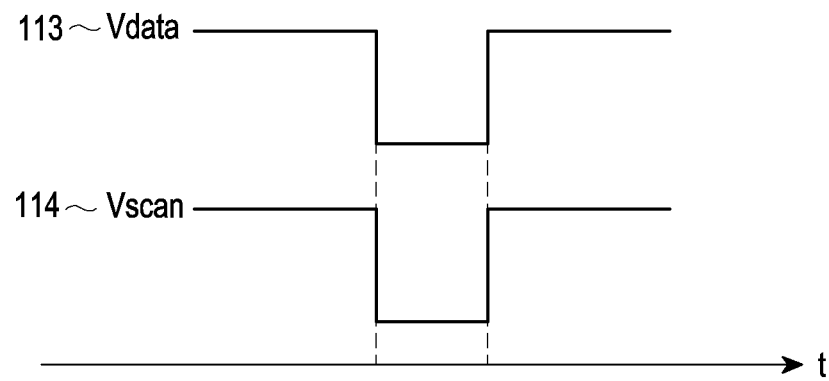
FIG. 3A is a timing graph for image data and control data according to an embodiment.
Figure 3B:
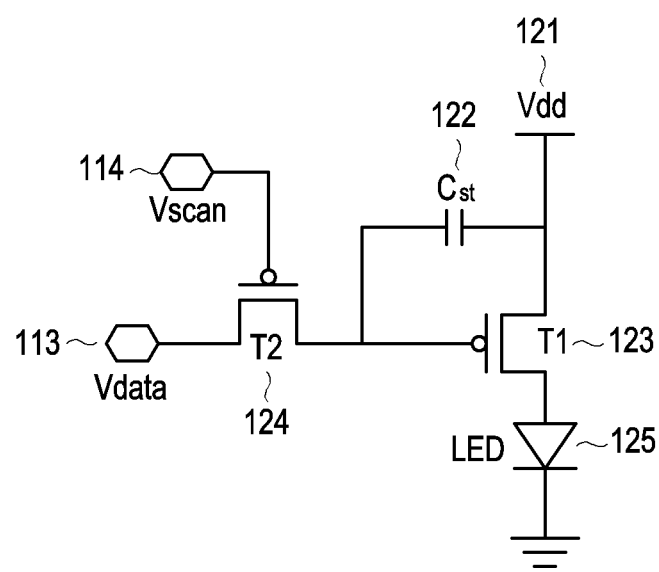
FIG. 3B is an active matrix circuit diagram according to an embodiment.

FIG. 3A is a timing graph for image data and control data according to an embodiment. Referring to FIG. 3A, the T-CON 101 may generate a controlled amount of data (e.g., Vdata 113) corresponding to each pixel of the display panel 100-1 to transmit the data to the display panel 100-1. Further, the T-CON 101 may generate scan data (e.g., Vscan 114) for selecting a pixel to be driven so that the controlled amount of data is input to the pixel. Referring to FIG. 3B, the signal Vdata 113 illustrated in FIG. 3A may be input to a second switch T2 124 controlled by the signal Vscan 114, and a signal output from the second switch 124 may control a first switch T1 123. The second switch 124 may control the flow of Vdata 113 by Vscan 114. A voltage Vdd 121 may be applied to the first switch 123, controlled by a signal output from the second switch 124, and then supplied to an LED 125 corresponding to each pixel of the display 100-1. A capacitor Cst 122 may be connected between a gate terminal of the first switch 123 and a source terminal or drain terminal of the first switch 123. The capacitor 122 may accumulate electric charges determined according to the voltage Vdd 121 applied to a data line, and the first switch 123 may receive a voltage based on the electric charges accumulated in the capacitor 122 and supply current to the LED 125 under the control of the output signal of the second switch 124. For example, when a low voltage state is applied to Vscan 114, a controlled amount of data may be ready to be applied to a corresponding pixel. When a voltage based on the controlled amount is applied to Vdata 113 in the low voltage state of Vscan 114, the LED 125 corresponding to the corresponding pixel may emit light. An active matrix circuit illustrated in FIG. 3B may have any of various structures such as 5T1C or 6T1C to correct a threshold voltage deviation of each pixel circuit transistor and the luminance of a pixel. Accordingly, various control signals may be added to the controlled amount of image data, Vdata 113 and Vscan 114 for selecting a pixel to be driven.

The COF 105 may receive digital image data (e.g., Vdata 113) and control data (e.g., Vscan 114) from the T-CON 101, and display an image on the display panel 100 by driving a DDI disposed in the COF 105. According to an embodiment, the type of the control data output from the T-CON 101 may be determined according to the DDI disposed in the COF 105, the display 100-1, and a pixel driving circuit. In FIGS. 3A and 3B, Vscan 114 is taken as an example of control data, for convenience of description, which should not be construed as limiting.

As the size of a display panel increases, a time difference may occur in the process of displaying colors on a screen, which may appear as an afterimage (dragging) on the screen, thereby degrading image quality. The T-CON 101 may provide the control data to the COF 105, and the COF 105 may control a timing of the image data transmitted to each display panel 100 based on the control data to prevent and/or reduce the degradation of the image quality.

According to an embodiment, although the digital data 103 is shown as transmitted through two wired lines in FIG. 2, it may be transmitted through one wired line or through three or more wired data lines to increase a transmission speed.

Figure 5A:
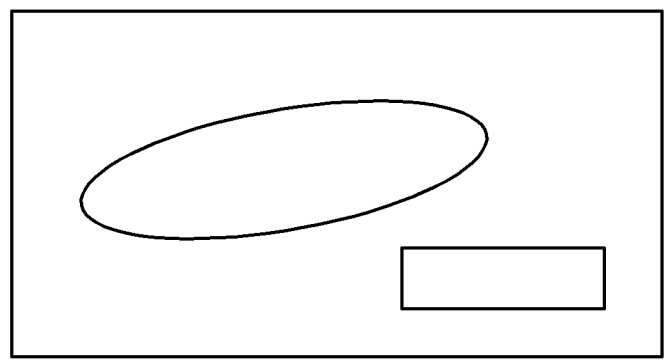
FIGS. 5A and 5B are diagrams illustrating a screen displayed on a display according to an embodiment.
Figure 5B:
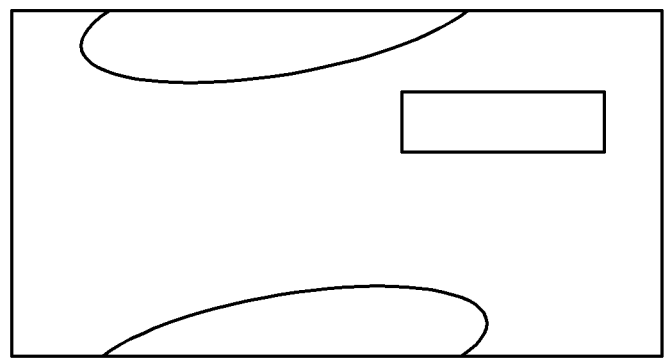

According to an embodiment, as the image data (e.g., digital data 103a and 103b) input to the display panel 100-1 may be synchronized with each other and output based on the plurality of control data, the image data may be displayed normally, as illustrated in FIG. 5A. On the other hand, when the image data (e.g., the digital data 103a and 103b) are not synchronized with each other, the image data may not be displayed as intended or no image may be represented, as illustrated in FIG. 5B.

Figure 4:
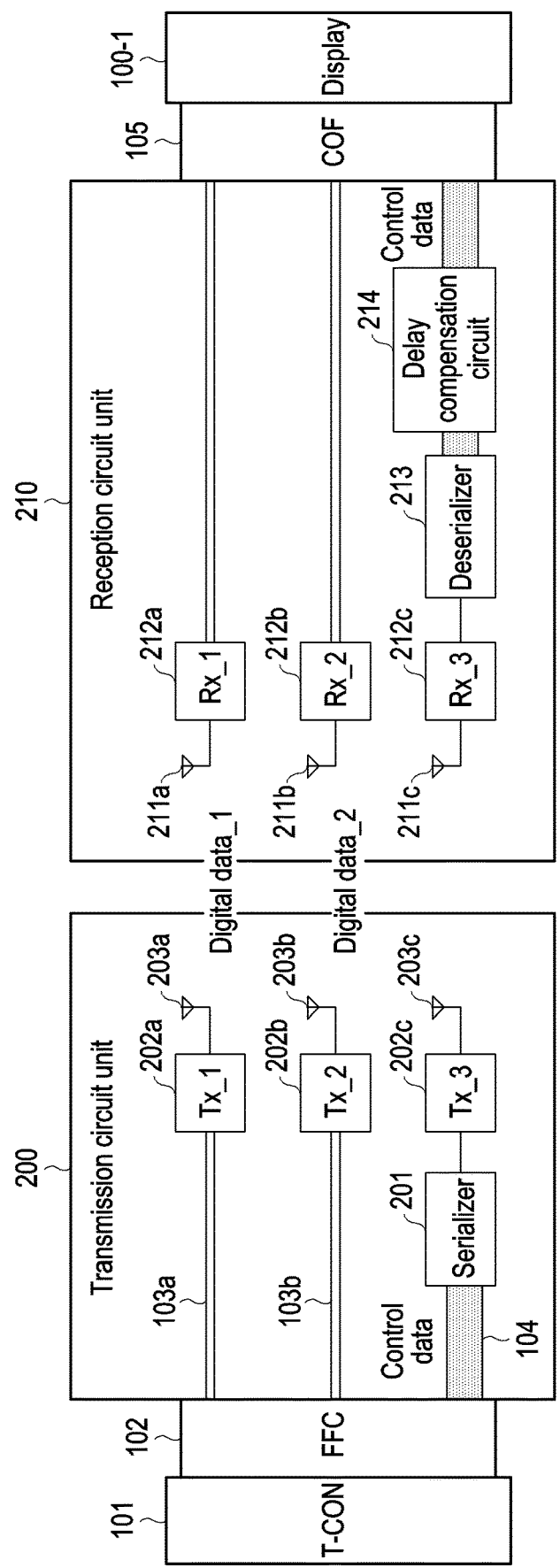
FIG. 4 is a block diagram illustrating an example configuration of an electronic device according to an embodiment.

FIG. 4 is a block diagram illustrating an example configuration of an electronic device according to an embodiment. Referring to FIG. 4, the T-CON 101 may wirelessly transmit digital data and control data to the COF 105.

According to an embodiment, a transmission circuit unit 200 may include at least one wireless transmitter (e.g., a first wireless transmitter 202a and a second wireless transmitter 202b) for transmitting image data, and a wireless transmitter (e.g., a third wireless transmitter 202c) for transmitting control data.

For example, image data generated by the T-CON 101 may be transmitted to the first wireless transmitter 202a and the second wireless transmitter 202b through the FFC 102. The first wireless transmitter 202a and the second wireless transmitter 202b may modulate the received image data to radio frequencies so that the received image data are transmitted through antennas (e.g., a first transmission antenna 203a and a second transmission antenna 203b), respectively. The image data modulated to the radio frequencies by the first wireless transmitter 202a and the second wireless transmitter 202b may be transmitted through the antennas (e.g., the first transmission antenna 203a and the second transmission antenna 203b), respectively.

According to an embodiment, the control data generated by the T-CON 101 may include a plurality of control data, and the plurality of control data may be input to a serializer 201 in parallel. The serializer 201 may receive the plurality of control data in parallel and convert them into serial control data, which will be described in greater detail below with reference to FIG. 6. The plurality of control data converted to the serial data by the serializer 201 may be transmitted to the third wireless transmitter 202c. The third wireless transmitter 202c may modulate the received plurality of control data to a radio frequency so that the control data are transmitted through an antenna (e.g., a third transmission antenna 203c). The plurality of control data modulated to the radio frequency by the third wireless transmitter 202c may be transmitted through the antenna (e.g., the third transmission antenna 203c).

According to an embodiment, a reception circuit unit 210 may include at least one wireless receiver (e.g., a first wireless receiver 212a and a second wireless receiver 212b) for demodulating received image data, and a wireless receiver (e.g., a third wireless receiver 212c) for demodulating control data. According to an embodiment, the first wireless receiver 212a and the second wireless receiver 212b may demodulate image data of radio frequencies received through antennas (e.g., a first reception antenna 211a and a second reception antenna 211b). The demodulated image data may be transmitted to the COF 105.

According to an embodiment, a third wireless receiver 212c may demodulate control data of a radio frequency received through an antenna (e.g., a third reception antenna 211c). The demodulated control data may be data obtained by serializing a plurality of control data, and a deserializer 213 may receive the serialized data and output the serialized data as parallel data before serialization. The plurality of control data output as the parallel data may be transmitted to the COF 105 after delay compensation through a delay compensation circuit 214.

A method of transmitting and receiving the plurality of control data will be described below in greater detail with reference to FIGS. 6, 7A, 7B, 7C, and 7D.

Figure 6:
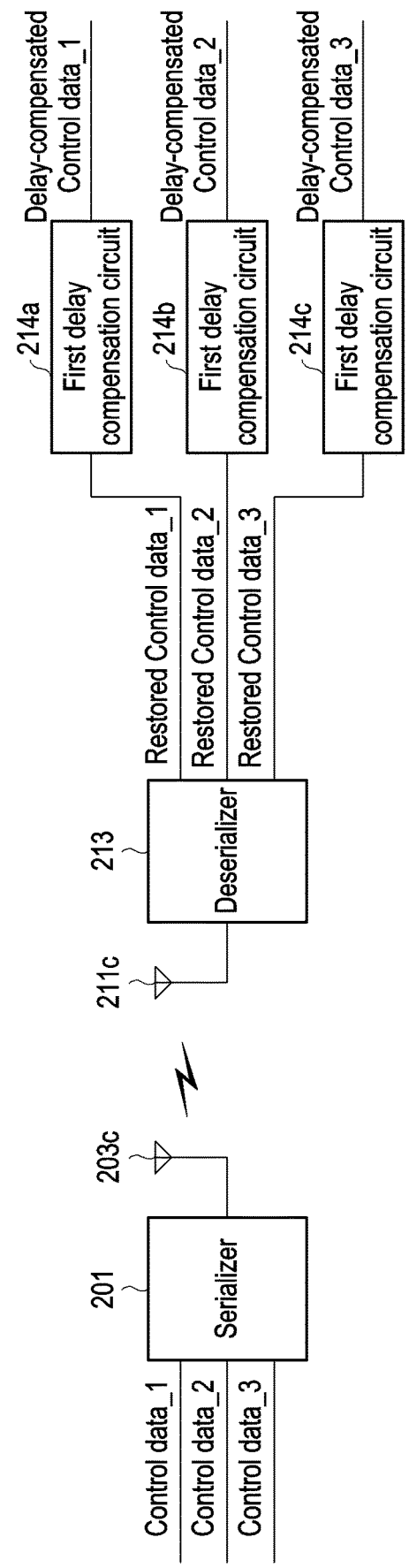
FIG. 6 is a block diagram illustrating an example configuration of an electronic device according to an embodiment.

FIG. 6 is a block diagram illustrating an example configuration of an electronic device according to an embodiment of the disclosure. Referring to FIG. 6, a plurality of control data (e.g., first control data Control data_1, second control data Control data_2, and third control data Control data_3 may be serialized through the serializer 201, and then transmitted through the antenna (e.g., the third transmission antenna 203c). While for convenience of description, it is assumed that the number of the plurality of control data is three in FIG. 6, various embodiments are not limited in number.

Figure 7A:
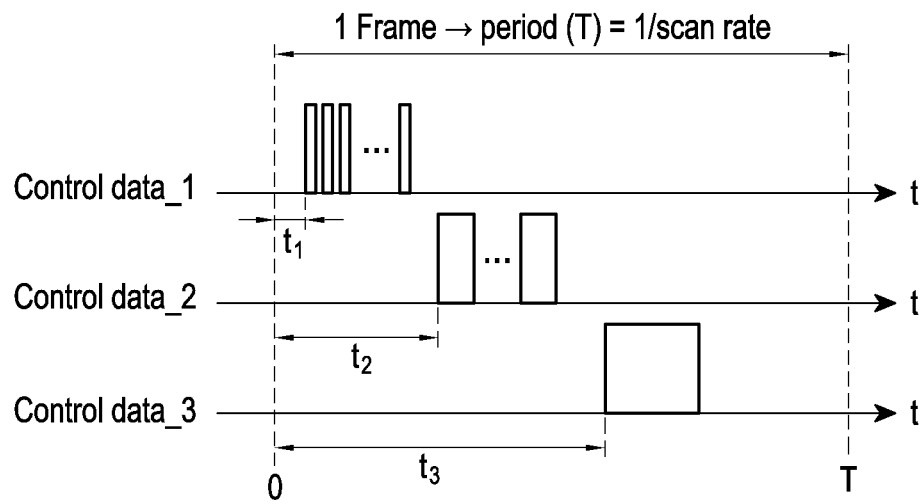
FIGS. 7A, 7B, 7C, and 7D are graphs illustrating timings of control data according to an embodiment.

For example, referring to FIG. 7A, the plurality of control data may be repeatedly transmitted on a frame basis. The period T of each frame may be the reciprocal of a scan rate. For example, the first control data may be active after t1 from the start of each frame, the second control data may be active after t2 from the start of each frame, and the third control data may be active after t3 from the start of each frame. According to an embodiment, the plurality of control data illustrated in FIG. 7A may be output as data serialized through the serializer 201 as illustrated in FIG. 7B.

Figure 7B:
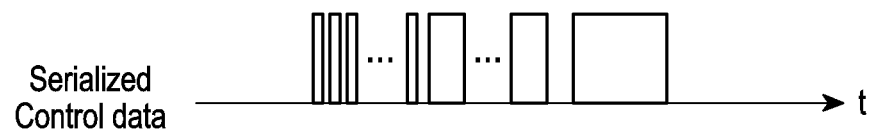
Figure 7C:
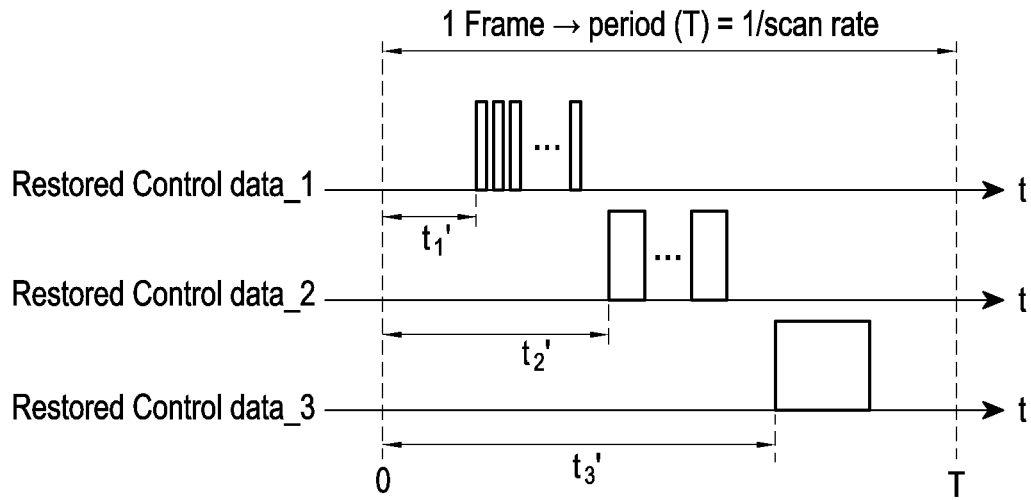
Figure 7D:
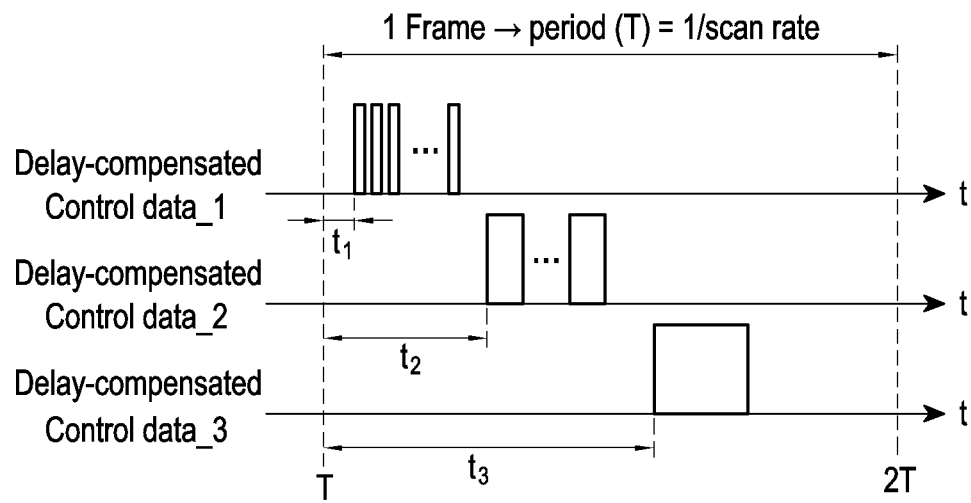

The serial plurality of control data illustrated in FIG. 7B may be transmitted to a wireless space through the antenna (e.g., the third transmission antenna 203c). The serial plurality of control data may be received through the antenna (e.g., the third reception antenna 211c) of the reception circuit unit 210 and output as parallel data through the deserializer 213. Referring to FIG. 7C, for example, the first control data may be restored to active data after t1' from the start of each frame, the second control data may be restored as active data after t2' from the start of each frame, and the third control data may be restored as active data after t3' from the start of each frame. As illustrated in FIG. 7C, even if the data are restored to parallel data, a delay may occur due to serial-to-parallel conversion and wireless data transmission/reception. The delay of the control data may be compensated for by each delay compensation circuit (e.g., a first delay compensation circuit 214a, a second delay compensation circuit 214b, and a third delay compensation circuit 214c. For example, the restored first control data may be delay-compensated by a time (e.g., T−t1'+t1) set by the first delay compensation circuit 214a, the restored second control data is delay-compensated by a time (e.g., T−t2'+t2) set by the second delay compensation circuit 214b, and the restored third control data may be delay-compensated by a time (e.g., T−t3'+t3) set by the third delay compensation circuit 214c. According to each delay compensation circuit, the first control data may be delay-compensated to data that is active after t1 from the start of each frame, the second control data may be delay-compensated to data that is active after t2 from the start of each frame, and the third control data may be delay-compensated to data that is active after t3 from the start of each frame.

As illustrated in FIGS. 4 and 6, when data is wirelessly transmitted between the T-CON 101 and each display module, all data should be synchronized for a normal image representation. To transmit the plurality of control data on one radio channel, a process of serializing the plurality of control data is required, and each display module receiving the transmitted control data needs additional deserialization and delay compensation processes for the received control data, as described above. Accordingly, the display may have a complex internal configuration and an increased size.

In various embodiments described below, the T-CON 101 may wirelessly transmit a trigger signal synchronized with digital data (e.g., image data), instead of a plurality of control data, and each display module may generate a plurality of control data based on the trigger signal. Therefore, components for data synchronization may be reduced.

In addition, in various embodiments described below, as the reception circuit unit 210 may generate a trigger signal based on received image data (e.g., a digital signal) and generate a plurality of control data based on the trigger signal, the image data may be synchronized without transmission and reception of the plurality of control data.

Figure 8A:
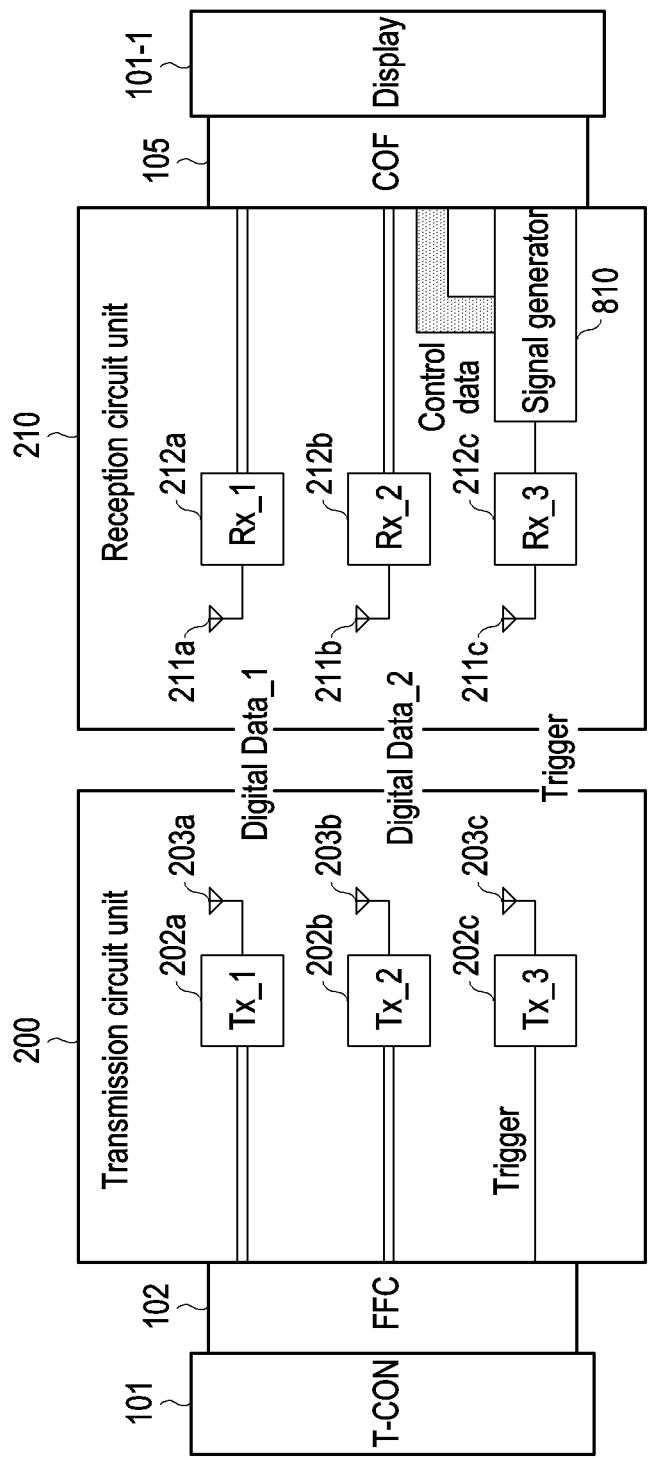
FIG. 8A is a block diagram illustrating an example configuration of an electronic device according to an embodiment.

FIG. 8A is a block diagram illustrating an example configuration of an electronic device according to an embodiment. Referring to FIG. 8A, the T-CON 101 may wirelessly transmit digital data and control data to the COF 105. According to an embodiment, the transmission circuit unit 200 may include at least one wireless transmitter (e.g., the first wireless transmitter 202a and the second wireless transmitter 202b) for transmitting image data, and a wireless transmitter (e.g., the third wireless transmitter 202c) for transmitting control data.

For example, image data generated by the T-CON 101 may be transmitted to the first wireless transmitter 202a and the second wireless transmitter 202b through the FFC 102. The image data generated by the T-CON 101 may be Vdata illustrated in FIG. 8B. The first wireless transmitter 202a and the second wireless transmitter 202b may modulate the received image data to radio frequencies so that the received image data are transmitted through antennas (e.g., the first transmission antenna 203a and the second transmission antenna 203b), respectively. The image data modulated to the radio frequencies by the first wireless transmitter 202a and the second wireless transmitter 202b may be transmitted through the antennas (e.g., the first transmission antenna 203a and the second transmission antenna 203b), respectively.

According to an embodiment, the T-CON 101 may generate a trigger signal. The trigger signal generated by the T-CON 101 may be Vtrig1 illustrated in FIG. 8B. For example, since a plurality of control data are repeated in the same pattern in every frame, as illustrated in FIG. 7A, the T-CON 101 may transmit the trigger signal (e.g., Vtrig1) instead of the plurality of control data. The trigger signal may be a sync signal synchronized with each frame. A triggering time of the trigger signal may be a start time or end time of each frame, or a time apart from the start time or end time of each frame by a specific time.

The trigger signal generated by the T-CON 101 may be transmitted to the third wireless transmitter 202c. The third wireless transmitter 202c may modulate the received trigger signal to a radio frequency to transmit the trigger signal through an antenna (e.g., the third transmit antenna 203c). The trigger signal modulated to the radio frequency by the third wireless transmitter 202c may be transmitted through the antenna (e.g., the third transmission antenna 203c).

According to an embodiment, the reception circuit unit 210 may include at least one wireless receiver (e.g., the first wireless receiver 212a and the second wireless receiver 212b) for demodulating received image data, and a wireless receiver (e.g., the third wireless receiver 212c) for demodulating a trigger signal. According to an embodiment, the first wireless receiver 212a and the second wireless receiver 212b may demodulate image data of radio frequencies received through antennas (e.g., the first reception antenna 211a and the second reception antenna 211b), respectively. The demodulated image data may be transmitted to the COF 105.

According to an embodiment, the third wireless receiver 212c may demodulate a trigger signal of a radio frequency received through an antenna (e.g., the third reception antenna 211c). The demodulated trigger signal may be input to a signal generator 810.

Figure 8B:
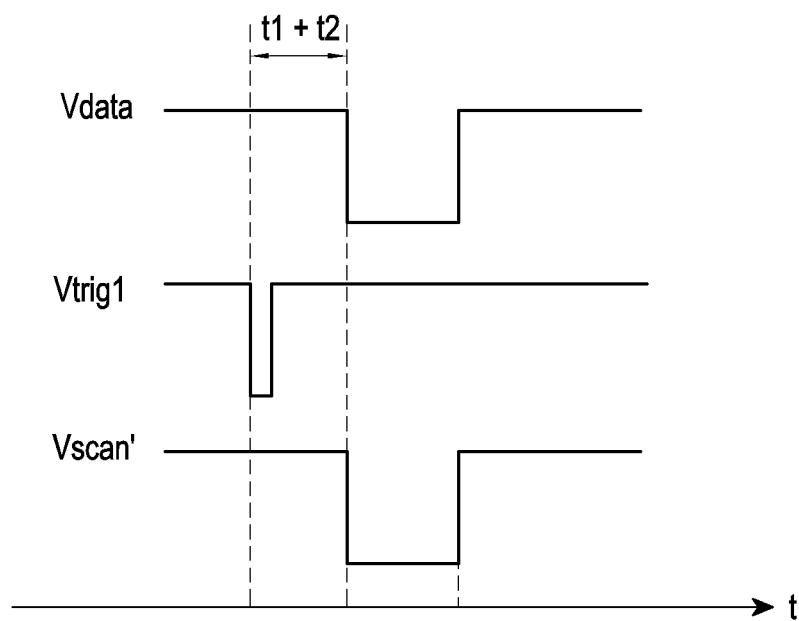
FIG. 8B is graph illustrating a timing of each control data according to an embodiment.

The signal generator 810 may include various circuitry and generate the plurality of control data (e.g., the first control data Control data_1, the second control data Control data_2, and the third control data Control data_3) illustrated in FIG. 7A from the trigger signal. For example, the signal generator 810 may generate control data (e.g., Vscan') from the trigger signal Vtrig1, as illustrated in FIG. 8B. According to an embodiment, the T-CON 101 may control generation of the trigger signal Vtrig1 earlier than the image data Vdata by a corresponding time delay (e.g., t1+t2) by compensating for a time delay t1 that may occur through a radio link and a time delay t2 that may occur when the signal generator 810 receiving the trigger signal generates the control data (e.g., Vscan'), as illustrated in FIG. 8B. The plurality of control data (e.g., Vscan') may be transmitted to the COF 105.

Figure 9:
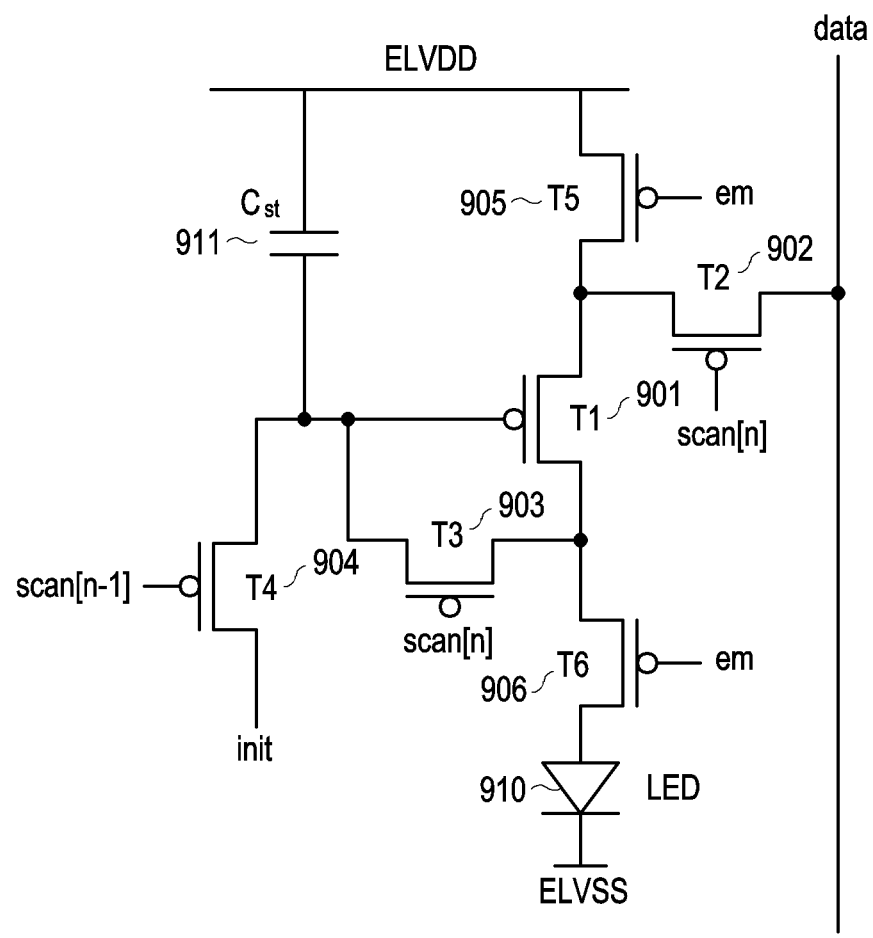
FIG. 9 is a circuit diagram illustrating an active matrix display circuit according to an embodiment.
Figure 10:
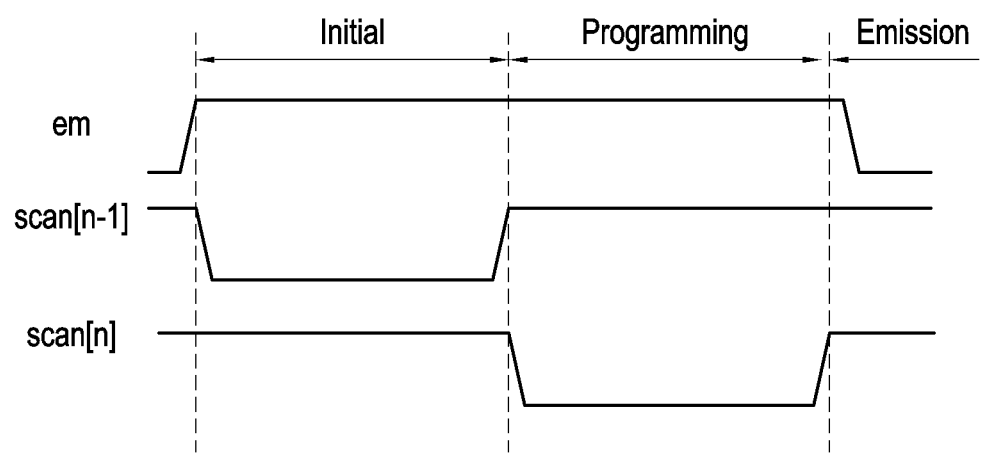
FIG. 10 is a graph illustrating a timing of each control data in an active matrix display according to an embodiment.

FIG. 9 is a circuit diagram of an active matrix display according to an embodiment. Referring to FIG. 9, an active matrix driving circuit for driving one LED 910 may include six transistors (e.g., metal-oxide semiconductor field-effect transistors (MOSFETs)) 901, 902, 903, 904, 905, and 906, and one capacitor Cst 911, to which various embodiments are not limited. Digital data for driving each pixel may be input to a second MOSFET 902, and a light emission timing of the LED 910 may be controlled by switching the six MOSFETs 901, 902, 903, 904, 905, and 906. According to an embodiment, a gate input signal (e.g., em, scan[n−1], or scan[n]) for controlling each MOSFET may correspond to each control data and be generated from the trigger signal by the signal generator 810. For example, the gate input signal (e.g., em, scan[n−1], or scan[n]) for controlling each MOSFET may be controlled to emit light in correspondence with an initial period, a programming period, and an emission period, as illustrated in FIG. 10.

Figure 11:
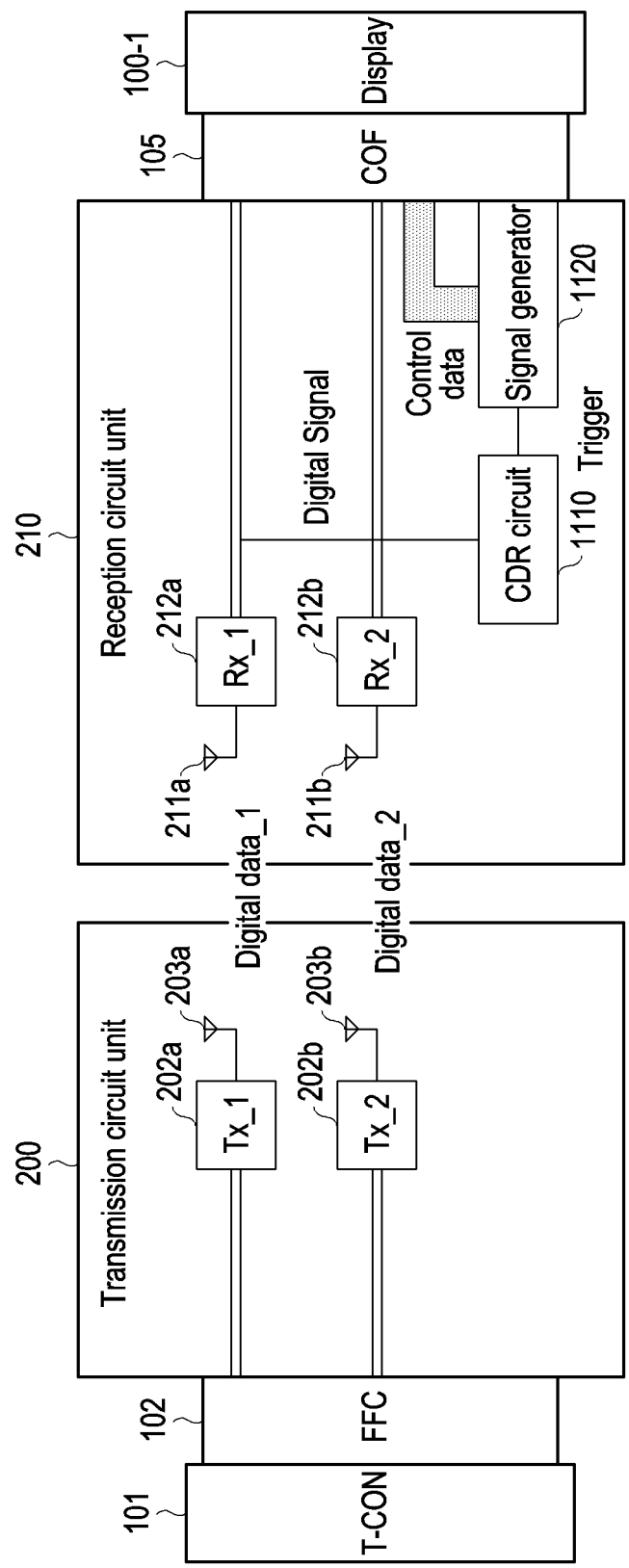
FIG. 11 is a block diagram illustrating an example configuration of an electronic device according to an embodiment.

FIG. 11 is a block diagram illustrating an example configuration of an electronic device according to an embodiment. Referring to FIG. 11, the T-CON 101 may wirelessly transmit digital data and control data to the COF 105. According to an embodiment, the transmission circuit unit 200 may include at least one wireless transmitter (e.g., the first wireless transmitter 202a and the second wireless transmitter 202b) for transmitting image data.

For example, image data generated by the T-CON 101 may be transmitted to the first wireless transmitter 202a and the second wireless transmitter 202b through the FFC 102. The first wireless transmitter 202a and the second wireless transmitter 202b may modulate the image data to radio frequencies to transmit the received image data through antennas (e.g., the first transmission antenna 203a and the second transmission antenna 203b), respectively. The image data modulated to the radio frequencies by the first wireless transmitter 202a and the second wireless transmitter 202b may be transmitted through antennas (e.g., the first transmission antenna 203a and the second transmission antenna 203b), respectively.

According to an embodiment, the reception circuit unit 210 may include at least one wireless receiver (e.g., the first wireless receiver 212a and the second wireless receiver 212b) for demodulating received image data. According to an embodiment, the first wireless receiver 212a and the second wireless receiver 212b may demodulate image data of radio frequencies received through antennas (e.g., the first receiving antenna 211a and the second receiving antenna 211b). The demodulated image data may be transmitted to the COF 105.

According to an embodiment, a clock data recovery (CDR) circuit 1110 may generate a trigger signal based on the image data output from the first wireless receiver 212a or the second wireless receiver 212b. For example, the CDR circuit 1110 may generate the trigger signal by parsing the received image data.

Figure 12:
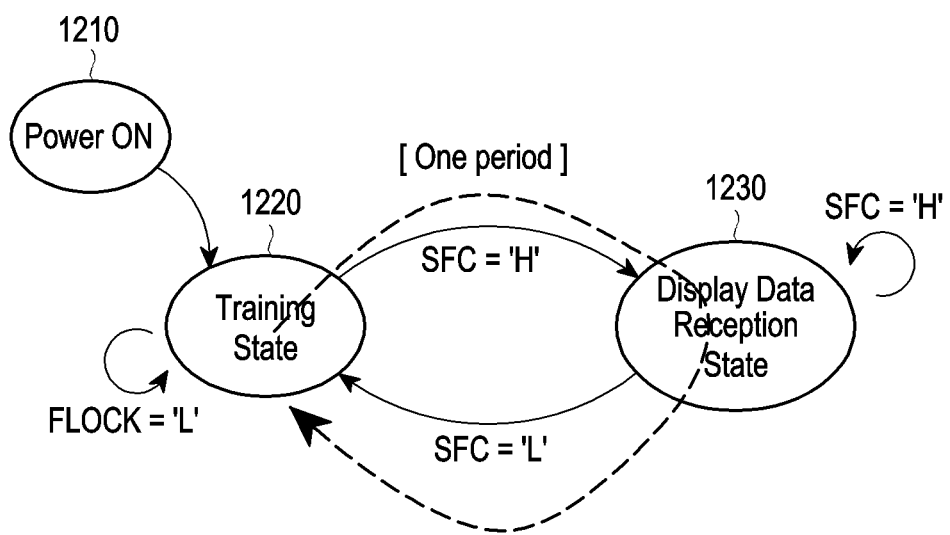
FIG. 12 is a state diagram illustrating states of an active matrix display according to an embodiment.

FIG. 12 is a state diagram illustrating various states of an active matrix display according to an embodiment. Referring to FIG. 12, upon power-on 1210, the active matrix display may be switched to a training state 1220, and when SFC is 'H', to a display data reception state 1230. If SFC is 'L' in the display data reception state 1230, it is switched to the training state 1220 again, and the state transition may be repeated in every cycle.

Figure 13A:
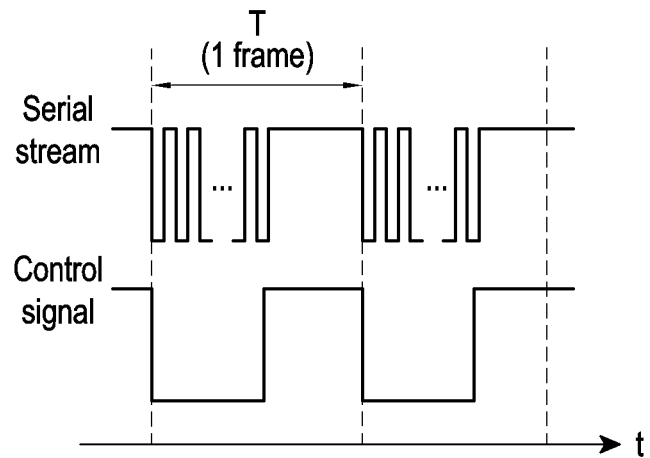
FIG. 13A is a graph illustrating a timing of each control data according to an embodiment.
Figure 13B:
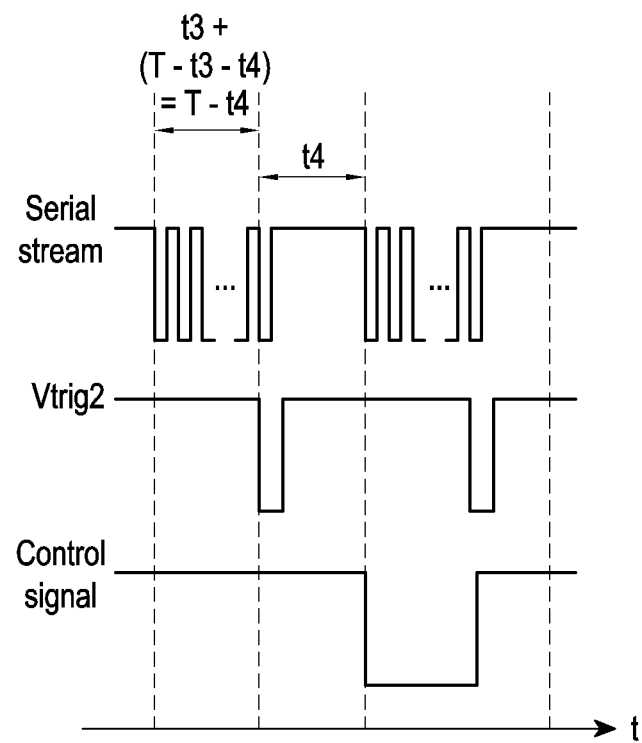
FIG. 13B is a graph illustrating a timing of each control data according to an embodiment.
Figure 13C:
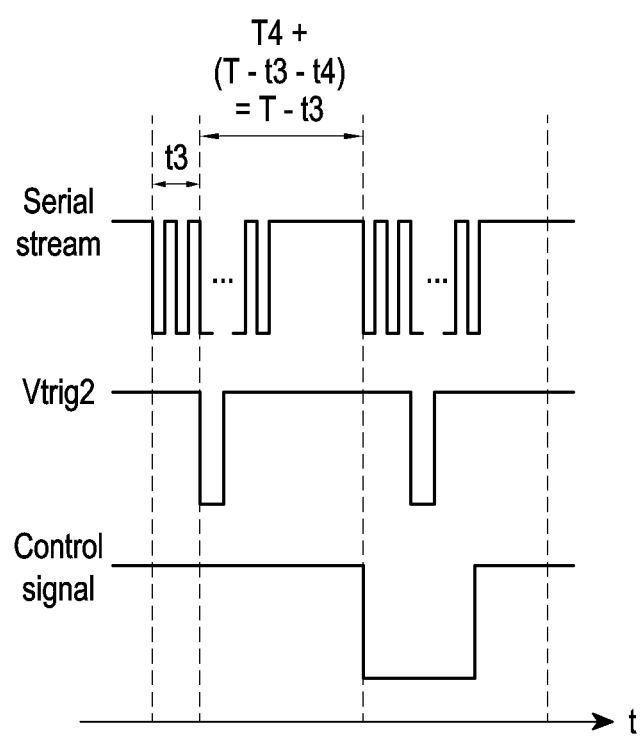
FIG. 13C is a graph illustrating a timing of each control data according to an embodiment.

According to an embodiment, as display pixels are highly integrated due to the development of high-speed digital circuits, data required for driving a display may be transmitted in a high-speed serial data stream (serial stream). The serial stream may be input to a DDI (e.g., the COF 105) capable of processing high-speed digital data, and the DDI may output the serial stream in parallel according to a display pixel driving circuit. To allow the DDI to output the serial stream in parallel at a correct time to drive display pixels, data of the serial stream should be restored according to a specific clock signal. The clock signal may be transmitted to the DDI through a separate wiring other than the serial stream data, or may be included and transmitted in the serial stream data. FIGS. 13A, 13B, and 13C illustrate that a clock signal is included in serial stream data. According to an embodiment, a clock signal required for accurate parallel output of serial stream data may have a predetermined frequency and a predetermined number of pulses. As illustrated in FIGS. 13A, 13B and 13C, the clock signal may be repeated in every frame period T.

Referring back to FIG. 11, the CDR circuit 1110 may identify time information about the serial stream data by detecting the frequency and number of pulses of the clock signal required for parallel output of the serial stream data. The CDR circuit 1110 may input a trigger signal Vtirg2 to a signal generator 1120 based on the identified time information, and the signal generator 1120 may include various circuitry and generate a control signal (or control data) required for driving the display.

Referring to FIGS. 13A and 13B, a time t3 may be taken for the CDR circuit 1110 to detect a clock signal and output a trigger signal Vtrig2, and a time t4 may be taken for the signal generator 1120 to receive the trigger signal and generate a control signal. Therefore, according to an embodiment, the CDR circuit 1110 or the signal generator 1120 may perform time compensation to synchronize between a serial stream and the control signal, as illustrated in FIGS. 13B and 13C. According to the above procedure, the signal generator 1120 may generate a control signal synchronized with serial stream data of next frame data based on previous frame data of the serial stream data.

According to an embodiment, the CDR circuit 1110 may parse the received image data and extract a trigger signal for generating control data in the training state 1220. The trigger signal extracted from the CDR circuit 1110 may be input to the signal generator 1120.

The signal generator 1120 may generate a plurality of control data (e.g., the first control data Control data_1, the second control data Control data_2, and the third control data Control data_3) illustrated in FIG. 7A from the trigger signal. The plurality of control data generated by the signal generator 1110 may be transmitted to the COF 105.

According to an embodiment, referring to FIG. 11, the reception circuit unit 210 may generate a plurality of control data without transmitting the plurality of control data or a trigger signal.

Figure 14:
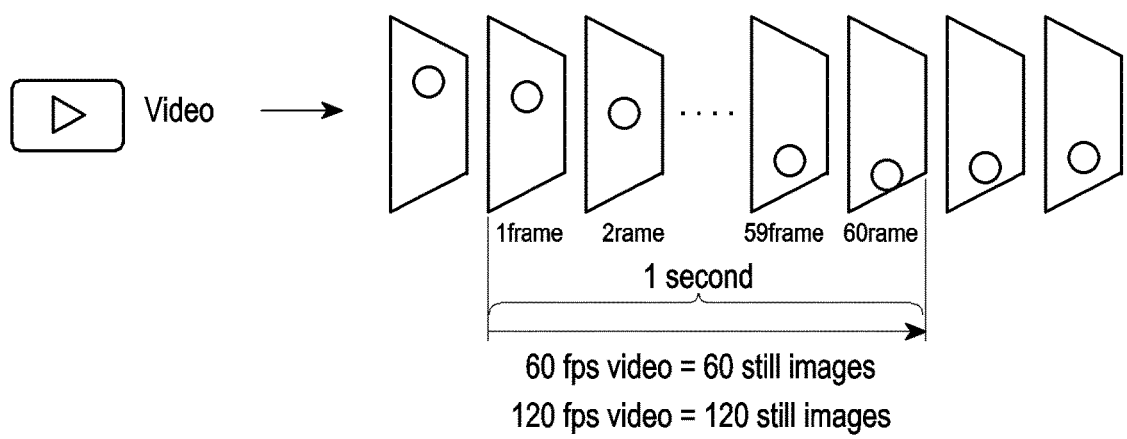
FIG. 14 is a diagram illustrating an example configuration of image data according to an embodiment.

FIGS. 14, 15, 16, and 17 are diagrams illustrating example configurations of image data in a modular display including a plurality of display modules according to an embodiment. Referring to FIG. 14, image data supplied to each display panel 100 may be a video of 60 frames per second (fps) or 120 fps. A transmission processing operation for image data may be performed by repeating an operation of configuring the image data for each image frame, transmitting the image data to a display module, and displaying the image data. According to an embodiment, image data forming each image frame may have a two-dimensional array matrix structure. For example, in the case of a full HD screen, the image data may include RGB information for 1920×1080 pixels. Control data may include information for adjusting the image data in addition to the image data. For example, the control data may include flag, gamma, and contrast information for distinguishing data formats.

Figure 15:
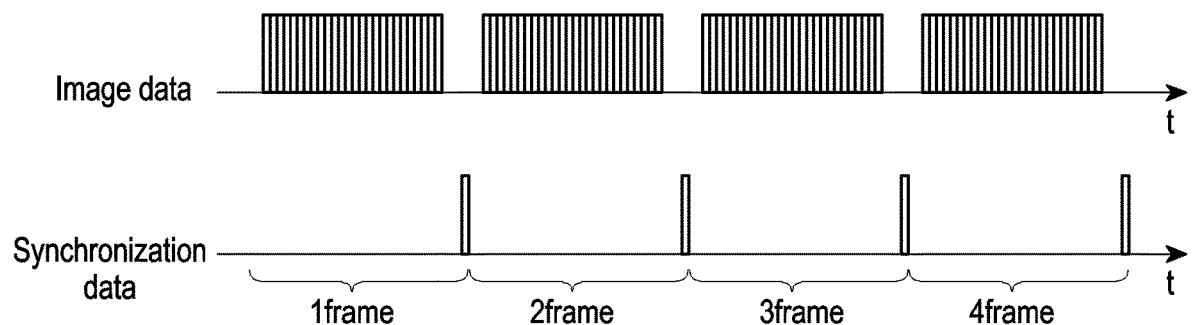
FIG. 15 is a diagram illustrating an example configuration of image data according to an embodiment.

According to an embodiment, referring to FIG. 15, synchronization data may be transmitted between each frame of image data. The T-CON 101 may wirelessly transmit a trigger signal based on synchronization data synchronized with digital data (e.g., the image data), and each display module may generate a plurality of control data based on the trigger signal. Therefore, components for data synchronization may be reduced.

Figure 16:
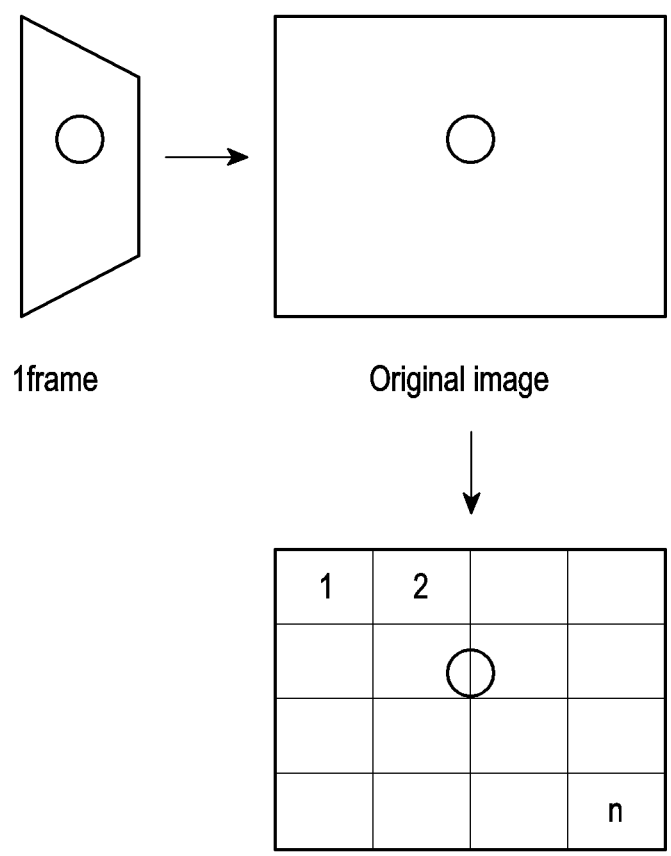
FIG. 16 is a diagram illustrating an example configuration of image data according to an embodiment.
Figure 17:
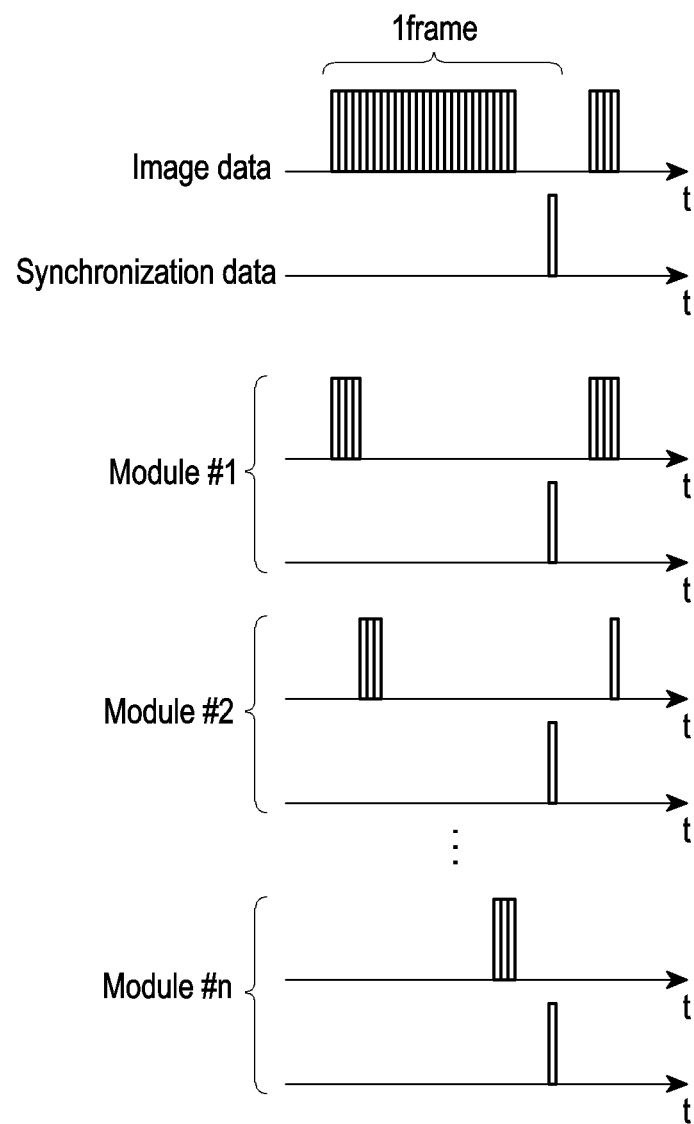
FIG. 17 is a diagram illustrating an example configuration of image data according to an embodiment.

Referring to FIG. 16, one image frame may be separately transmitted for each of a plurality of display modules. For example, the reception circuit unit 210 illustrated in FIG. 8A or FIG. 11 may be configured to correspond to each display module. Referring to FIG. 17, image data received through each reception circuit unit 210 in each display module may be transmitted sequentially in time.

A display module according to an example embodiment may include: at least one first antenna, a second antenna, a signal generation circuit configured to generate a plurality of control signals to control the image signal from the trigger signal received through the second antenna, wherein the trigger signal is received through the second antenna and corresponds to the image signal, and wherein the image signal is received through the at least one first antenna and corresponds to the display module configured to display at least part of an entire image among a plurality of display modules configured to display the entire image, and a display panel configured to display the image signal received from the at least one first antenna based on the generated plurality of control signals.

According to an embodiment, the at least one first antenna may include a plurality of antennas, and the image signal may be transmitted in a distributed manner to the plurality of antennas.

According to an embodiment, the display module may be configured to generate the trigger signal in each image frame transmitted periodically.

According to an embodiment, the trigger signal may include a sync signal synchronizable with each image frame transmitted periodically.

According to an embodiment, the display module may be configured to generate the trigger signal at a start time of each image frame transmitted periodically or at a time spaced apart from the start time of the image frame by a specific time.

A method of controlling a display module according to an example embodiment may include: receiving an image signal corresponding to a display module configured to display at least part of an entire image among a plurality of display modules configured to display the entire image through at least one first antenna, receiving a trigger signal corresponding to the image signal through a second antenna, generating a plurality of control signals to control the image signal from the trigger signal received through the second antenna, and displaying the image signal received from the at least one first antenna based on the generated plurality of control signals.

According to an embodiment, at least one first antenna may include a plurality of antennas, and the display module may be configured to transmit the image signal in a distributed manner to the plurality of antennas.

According to an embodiment, the display module may be configured to generate the trigger signal in each image frame transmitted periodically.

According to an embodiment, the trigger signal may include a sync signal synchronizable with each image frame transmitted periodically.

According to an embodiment, the display module may be configured to generate the trigger signal at a start time of each image frame transmitted periodically or at a time spaced apart from the start time of the image frame by a specific time.

A display module according to an example embodiment may include: at least one antenna configured to receive an image signal corresponding to a display module configured to display at least part of an entire image among a plurality of display modules configured to display the entire image, a first signal generation circuit configured to generate a trigger signal corresponding to the image signal by parsing the received image signal, a second signal generation circuit configured to generate a plurality of control signals to control the image signal from the trigger signal generated through the first signal generation circuit, and a display panel configured to display the image signal received from the antenna based on the generated plurality of control signals.

According to an embodiment, the display module may be configured to extract the trigger signal in a training state of the image signal.

According to an embodiment, the display module may be configured to generate the trigger signal in each image frame transmitted periodically.

According to an embodiment, the trigger signal may include a sync signal synchronizable with each image frame transmitted periodically.

According to an embodiment, the display module may be configured to generate the trigger signal at a start time of each image frame transmitted periodically or at a time spaced apart from the start time of the image frame by a specific time.

A method of controlling a display module according to an example embodiment may include: receiving an image signal corresponding to a display module configured to display at least part of an entire image among a plurality of display modules configured to display the entire image through at least one antenna, generating a trigger signal corresponding to the image signal by parsing the received image signal, generating a plurality of control signals to control the image signal from the trigger signal generated through the first signal generation circuit, and displaying the image signal received from the at least one antenna based on the generated plurality of control signals.

According to an embodiment, the trigger signal may be extracted in a training state of the image signal.

According to an embodiment, the trigger signal may be generated in each image frame transmitted periodically.

According to an embodiment, the trigger signal may include a sync signal synchronizable with each image frame transmitted periodically.

According to an embodiment, the trigger signal may be generated at a start time of each image frame transmitted periodically or at a time spaced apart from the start time of the image frame by a specific time.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "$1^{st}$" and "$2^{nd}$", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, logic, logic block, part, or circuitry. A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software including one or more instructions that are stored in a storage medium (e.g., internal memory or external memory) that is readable by a machine (e.g., the electronic device 10). For example, a processor of the machine (e.g., the electronic device 10) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to an embodiment, each component (e.g., a module or a program) of the above-described components may include a single entity or multiple entities, and some of the multiple entities may be separately disposed in different components. According to an embodiment, one or more of the above-described components may be omitted, or one or more other components may be added. Alternatively or additionally, a plurality of components (e.g., modules or programs) may be integrated into a single component. In such a case, according to an embodiment, the integrated component may still perform one or more functions of each of the plurality of components in the same or similar manner as they are performed by a corresponding one of the plurality of components before the integration. According to an embodiment, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A display module comprising:
at least one first antenna;
a second antenna;
a signal generation circuit configured to generate a plurality of control signals to control an image signal based on a trigger signal received through the second antenna, wherein the trigger signal is received through the second antenna and corresponds to the image signal, and wherein the image signal is received through the at least one first antenna and corresponds to the display module configured to display at least part of an entire image among a plurality of display modules configured to display the entire image; and
a display panel configured to display the image signal received from the at least one first antenna based on the generated plurality of control signals.

2. The display module of claim 1, wherein the at least one first antenna includes a plurality of antennas, and the image signal is transmitted distributedly to the plurality of antennas.

3. The display module of claim 1, wherein the trigger signal is generated in each image frame transmitted periodically.

4. The display module of claim 1, wherein the trigger signal includes a sync signal synchronizable with each image frame transmitted periodically.

5. The display module of claim 1, wherein the trigger signal is generated at a start time of each image frame transmitted periodically or at a time spaced apart from the start time of the image frame by a specific time.

6. A method of controlling a display module, comprising:
receiving an image signal corresponding to the display module configured to display at least part of an entire image among a plurality of display modules configured to display the entire image through at least one first antenna;
receiving a trigger signal corresponding to the image signal through a second antenna;
generating a plurality of control signals to control the image signal from the trigger signal received through the second antenna; and
displaying the image signal received from the at least one first antenna based on the generated plurality of control signals.

7. The method of claim 6, wherein the at least one first antenna includes a plurality of antennas, and the image signal is transmitted distributedly to the plurality of antennas.

8. The method of claim 6, wherein the trigger signal is generated in each image frame transmitted periodically.

9. The method of claim 6, wherein the trigger signal includes a sync signal synchronizable with each image frame transmitted periodically.

10. The method of claim 6, wherein the trigger signal is generated at a start time of each image frame transmitted periodically or at a time spaced apart from the start time of the image frame by a specific time.

11. A display module comprising:
at least one antenna;
a first signal generation circuit configured to generate a trigger signal corresponding to an image signal by parsing the image signal, wherein the image signal is received through the at least one antenna and corresponds to the display module configured to display at least part of an entire image among a plurality of display modules configured to display the entire image;
a second signal generation circuit configured to generate a plurality of control signals to control the image signal based on the trigger signal generated through the first signal generation circuit; and
a display panel configured to display the image signal received from the at least one antenna based on the generated plurality of control signals.

12. The display module of claim 11, wherein the trigger signal is extracted in a training state of the image signal.

13. The display module of claim 11, wherein the trigger signal is generated in each image frame transmitted periodically.

14. The display module of claim 11, wherein the trigger signal includes a sync signal synchronizable with each image frame transmitted periodically.

15. The display module of claim 11, wherein the trigger signal is generated at a start time of each image frame transmitted periodically or at a time spaced apart from the start time of the image frame by a specific time.

16. A method of controlling a display module, the method comprising:
receiving an image signal corresponding to the display module configured to display at least part of an entire image among a plurality of display modules configured to display the entire image through at least one antenna of the display module,
generating a trigger signal corresponding to the image signal by parsing the received image signal,
generating a plurality of control signals to control the image signal based on the trigger signal generated through the first signal generation circuit, and displaying the image signal received from the at least one antenna based on the generated plurality of control signals.

17. The method of claim 16, wherein the trigger signal is extracted in a training state of the image signal.

18. The method of claim 16, wherein the trigger signal is generated in each image frame transmitted periodically.

19. The method of claim 16, wherein the trigger signal includes a sync signal synchronizable with each image frame transmitted periodically.

20. The method of claim 16, wherein the trigger signal is generated at a start time of each image frame transmitted periodically or at a time spaced apart from the start time of the image frame by a specific time.

* * * * *